Figure 1:
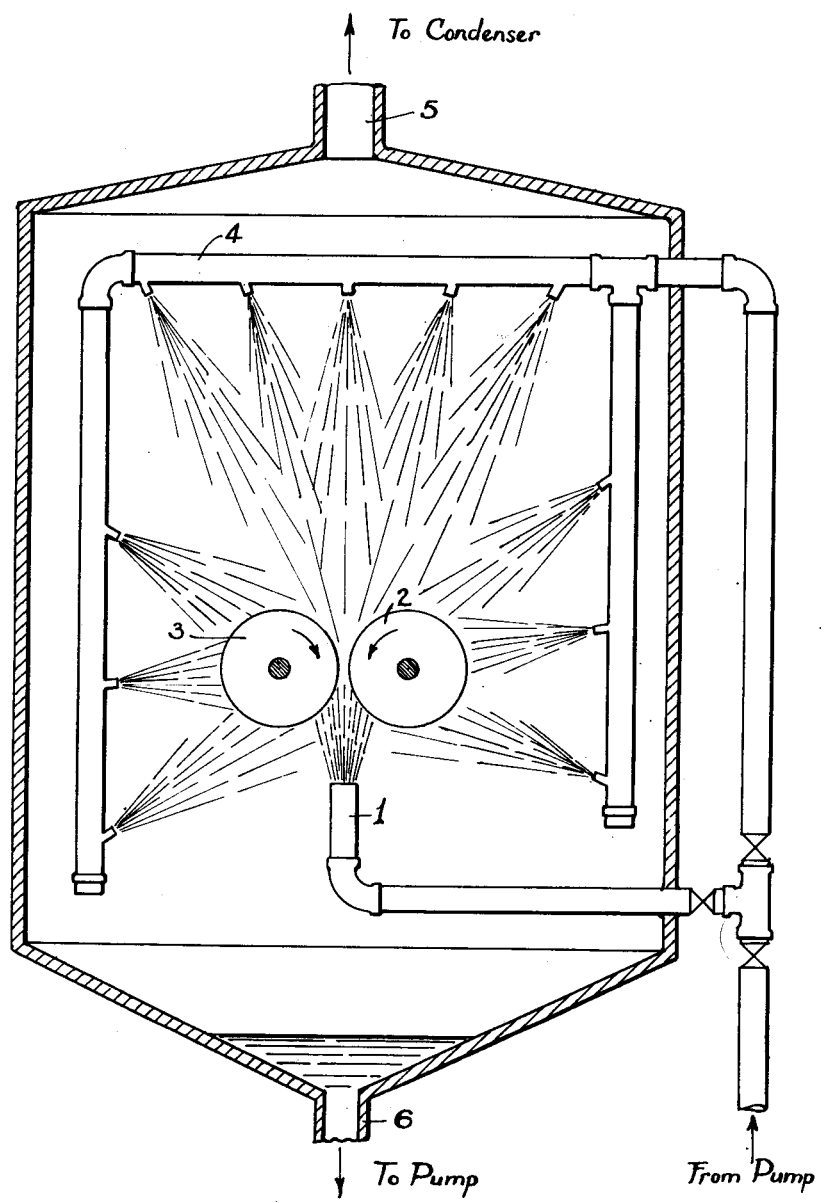

Patented Nov. 15, 1932

1,887,658

UNITED STATES PATENT OFFICE

HOWARD S. NUTTING AND HOWARD H. ROWLEY, OF MIDLAND, MICHIGAN, ASSIGNORS TO THE DOW CHEMICAL COMPANY, OF MIDLAND, MICHIGAN, A CORPORATION OF MICHIGAN

DECOMPOSITION OF LIQUID HYDROCARBONS

Application filed July 26, 1930. Serial No. 471,073.

The present invention relates to methods for the decomposition of hydrocarbon oils to form gaseous unsaturated compounds, particularly to methods wherein such oils are decomposed in an electric arc to form gaseous compounds including acetylene.

It is known that hydrocarbons, when subjected in either gaseous or liquid phase to the action of an electric arc, are thermally decomposed into compounds of lower molecular weight containing relatively lower percentages of hydrogen than originally. When liquid hydrocarbons were used, heretofore one method has been to immerse the arc in the liquid. We now have found that higher yields of unsaturated compounds can be obtained by directing the hydrocarbon to be reacted into the arc zone in subdivided form such as a shower, spray, mist or fog, and then rapidly cooling the gaseous reaction product by directing additional subdivided hydrocarbon oil thereinto, the percentage of acetylene in the gaseous reaction product being increased, while the percentages of hydrogen and carbon-black are materially decreased.

In carrying out our invention, a stream of particles of oil to be cracked is directed into a heating zone which may be either a continuous or discontinuous electric arc, a material portion of the so supplied oil being thereby vaporized substantially completely and decomposed into gaseous unsaturated compounds. To prevent untoward further decomposition of, or undesirable reaction between, the constituents of the gaseous mixture produced, the latter is to be cooled extremely rapidly by intimately contacting the same with a spray of oil which may be the same as the heat-treated oil or of different composition, substantially immediately after the formation of such gas. We prefer to inject a fairly copious and coarse spray of oil into the arc and to direct a copious relatively finer spray of oil against and into the gases issuing from the arc, for cooling purposes. It is convenient to obtain both such heavy and finer sprays from the same source of oil, in which case, the excess oil may be recycled, with or without pre-cooling or pre-cooling only of that portion used as cooling medium.

By operating our new and improved method as above described, the hydrocarbon spray to be cracked in the heating zone is in a form which presents a relatively large surface area and readily penetrates the heating zone, possibly even into the arc itself, and which therefore can be very uniformly subjected to thermal action, absorbing some of the added heat in being volatilized before being decomposed, the action obtained thereon accordingly being more uniform and causing less untoward decomposition of the oil or gases. Furthermore, by immediately contacting the produced gases or vapors with more of said dispersed oil, in the manner described, a very rapid and uniform cooling of such gases is obtained, the cooling being efficient because of more intimate contact between the material to be cooled and the cooling agent, and because the heat contained in the reaction gases is utilized to a certain extent in evaporating the cooling oil spray.

The invention, then, consists of the method hereinafter fully described and particularly pointed out in the claims, the annexed drawing and following description setting forth in detail certain modes of carrying out our invention, such disclosed modes setting forth, however, but several of the various ways in which the principle of our invention may be used.

In said annexed drawing:—

The figure represents a preferred apparatus suitable for carrying out our invention. The hydrocarbon oil to be treated is sprayed from a nozzle 1 into an arc formed between two rotating electrodes 2 and 3 in which gasification and cracking occurs. The gases thereby formed are then intimately contacted and rapidly cooled by a spray of oil issuing from jets in pipe 4 directed at the arc and the gaseous atmosphere issuing therefrom, and are then passed together with the vaporized oil through exit pipe 5 to a condenser, not shown. Excess oil from the heating zone collects and passes through exit pipe 6 to a pump, not shown, which recirculates the same to the spraying system. The oil condensed from the reaction gases likewise is returned to the circulating pump.

The sprays of cooling agent, e. g. oil, will be preferably directed at the arc to cause the forcible entry of the drops or droplets of oil into the gases issuing therefrom so as to exert cooling action thereon in a rapid or sudden manner; such sprays may be directed from above or/and from the sides as desired.

The electrodes are disks constructed of a suitable material, such as carbon, iron, copper, aluminum, or combination thereof, and may rotate in the same or opposite directions, and with or against the flow of oil to be cracked.

The following examples illustrate several of the various ways in which our invention may be utilized. In each example approximately 14 pounds of hydrocarbon oil was circulated through the spraying system including both the oil to be cracked and the cooling spray, during the time specified, only a fraction of the oil being cracked to form the reaction gases, the latter together with the carbon-black totalling approximately the theoretical amount obtainable from the amount of used oil.

The arc was struck by contacting the two electrodes, and then adjusting the distance therebetween until a suitable arc was maintained, such distance, however, being approximately $\frac{1}{16}$ inch.

The voltage of the produced arc was direct at about 120 volts, the amperage about 25 to 30 amperes, and the electrodes rotating at a speed of about 1260 R. P. M.

*Example 1*

A heavy spray of kerosene having a specific gravity of 0.805 at 20° C., was supplied upwards through nozzle 1, directed at an electric arc so as to pass into the arc heating zone, the arc being struck between two rotating graphite electrodes 2 and 3, as shown in the accompanying figure, the anode being 1½ inches in diameter and ¼ inch wide, the cathode being of the same diameter but ½ inch wide, said electrodes being rotated in opposite directions downwardly against the oil spray at the point of contact between the electrodes.

The gaseous reaction product was cooled with a fine kerosene spray directed from pipe 4 towards and into the said product issuing from the arc, the temperature of such cooled gaseous product being approximately 65° C. at a point 2 inches above the electrodes. Excess unconsumed and condensed oil was recycled. The power input was 3.26 k. w.

There was obtained in 1 hour, 0.04 pound of carbon black and about 500 liters of gas, the latter comprising approximately 42 per cent of unsaturated hydrocarbons, 52 per cent of hydrogen, and 5 per cent of saturated hydrocarbons. The unsaturated hydrocarbons consisted of approximately 60 per cent of acetylene and 40 per cent of ethylene.

*Example 2*

A heavy spray of kerosene was decomposed as in the above example, both the rotating electrodes being 1½ inches in diameter, ¼ inch thick, and made of copper, the excess and condensed oil being cooled before recirculation. The power input was 3.72 k. w. The gaseous product was cooled to a temperature of 65° C. at a point two inches above the electrodes.

In one hour, 0.08 pound of carbon black and about 550 liters of gas were obtained. The latter gas consisted of approximately 42 per cent of unsaturated hydrocarbons, 4 per cent of saturated hydrocarbons and 52 per cent of hydrogen. The unsaturated hydrocarbons comprised substantially 72 per cent of acetylene and 28 per cent ethylene.

*Example 3*

Kerosene was cycled in 26 minutes as in Example 2, between a pair of electrodes of the same diameter as therein, but one electrode being aluminum and the other graphite. The power input was 1.45 k. w. 0.088 pound of carbon black and about 275 liters of gas was thereby obtained, the latter consisting of essentially 38 per cent of unsaturated hydrocarbons, 4 per cent of saturated hydrocarbons, and 53 per cent of hydrogen. The unsaturated gas comprised approximately 65 per cent of acetylene and 35 per cent of ethylene.

*Example 4*

Kerosene was cracked as in the above example, except that the two electrodes were both of graphite and rotated upward in the same direction as the oil spray directed thereagainst, one electrode being 1¼ inches by ¼ inch, the other being 1½ inches by ¼ inch. The reaction gases were cooled to approximately 69° C. at 2 inches above the arc. The power input was 1.98 k. w. By operating as above, in 39 minutes there was obtained 0.097 pound of carbon black and about 210 liters of gas consisting of approximately 31 per cent of unsaturated hydrocarbons, 5 per cent of saturated hydrocarbons, and 60 per cent of hydrogen. The unsaturated gases were approximately 64 per cent of acetylene and 36 per cent of ethylene.

*Example 5*

Kerosene was treated for 1 hour in an arc formed between two rotating graphite electrodes, both electrodes being 1½ inches by ¼ inch, similarly as in Example 2 except that the vaporized excess and cooling oil which was condensed was not cooled before recirculation of the same in the process. The temperature of the reaction gases varied between 35 and 104° C. at two inches above the electrodes. The power input was 3.31 k. w. From the used oil, there was obtained 0.086 pound of carbon black and about 625 liters of gas having substantially the following composition:—44 per cent of unsaturated gases, 3 per cent of saturated gases and 51 per cent of hydrogen. The unsaturated gases comprised essentially 69 per cent of acetylene and 31 per cent of ethylene.

*Example 6*

Crude oil, having a specific gravity of 0.815 at 20° C., was treated similarly as the kerosene in Example 1, except that the electrodes were both made of graphite and were 1¾ inches in diameter by ¼ inch thick. The power input was 3.92 k. w. In one hour there was obtained 0.168 pound of carbon black together with about 850 liters of gas comprising approximately 40 per cent unsaturated hydrocarbons, 6 per cent of saturated hydrocarbons, 51 per cent of hydrogen and 3 per cent of nitrogen. The unsaturated hydrocarbons consisted of about 65 per cent acetylene and 35 per cent ethylene.

Our present invention may be carried out in various ways. For instance, the hydrocarbon oil may be directed against and into the arc by forcing a stream of oil under suitable pressure through a suitable spray nozzle or equivalent device, or if preferred, the oil may be injected into the arc by atomization employing therefor a current of gas or vapor under pressure. Such gas or vapor may be derived from the gases developed in the process, or residual portion thereof, or may be any other suitable vapor or gas, such as natural gas or methane.

Accordingly, our invention consists in a new and improved method of decomposing hydrocarbon oils thereby forming gaseous unsaturated compounds including acetylene and ethylene, the method involving supplying the source-material to the heating zone in a liquid subdivided form such as a spray, and then cooling the gaseous reaction product by contacting the latter immediately after the formation thereof also with a subdivided liquid such as oil, it being understood that such oil sprays, etc. may be used independently or in conjunction with additional material such as gases or vapors.

In the claims, it is to be understood that the term "subdivided" is intended to mean that the oil is in the form of a shower, spray, mist, or fog, or other equivalent dispersed liquid form.

Other modes of applying the principle of our invention may be employed instead of those explained, change being made as regards the method herein disclosed, provided the details stated by any of the claims or the equivalent of such be employed.

We therefore particularly point out and distinctly claim as our invention:—

1. In a method of decomposing a hydrocarbon oil to produce a gaseous mixture rich in acetylene, the steps which consist in spraying a stream of such oil into the field of an electric arc, and immediately thereafter contacting the gases thereby formed with a finely subdivided spray of relatively cold oil, whereby decomposition or recombination of such gases is materially reduced.

2. In a method of decomposing a hydrocarbon oil to produce a gaseous mixture rich in acetylene, the steps which consist in spraying a stream of such oil into the field of an electric arc formed between rotating electrodes, and immediately thereafter contacting the gases thereby formed with a finely subdivided spray of relatively cold oil, whereby decomposition or recombination of such gases is materially reduced.

3. The method of decomposing a hydrocarbon oil to produce a gaseous mixture rich in acetylene, which comprises forcibly directing a dispersed stream of such oil into the field of an electric arc formed between disc electrodes rotating in opposite directions against the stream of oil, while maintaining in the space surrounding said electrodes a mist or fog of finely subdivided oil, whereby rapid cooling of gaseous products is effected by contact with the liquid particles of such oil mist.

Signed by us this 14 day of July, 1930.

HOWARD S. NUTTING.
HOWARD H. ROWLEY.